United States Patent [19]

Comas et al.

[11] 3,921,009

[45] Nov. 18, 1975

[54] RECEIVER FOR PULSE WIDTH MODULATED SIGNALS

[75] Inventors: Enrique G. Comas, Fairport; Michael G. Emler, Rochester, both of N.Y.

[73] Assignee: Stromberg-Carlson Corporation, Rochester, N.Y.

[22] Filed: Apr. 12, 1974

[21] Appl. No.: 460,288

[52] U.S. Cl. ................ 307/234; 328/112; 328/119; 329/106; 360/44

[51] Int. Cl.² ........................ H03K 9/08; H03K 5/00

[58] Field of Search ................ 307/221 R, 232, 234; 328/112, 119; 360/44; 329/104, 106

[56] References Cited

UNITED STATES PATENTS

| | | | |
|---|---|---|---|
| 2,887,674 | 5/1959 | Greene | 360/44 |
| 3,171,892 | 3/1965 | Pantle | 329/106 X |
| 3,688,260 | 8/1972 | Jensen et al. | 329/106 X |

*Primary Examiner*—John Zazworsky
*Attorney, Agent, or Firm*—Hoffman Stone; William F. Porter, Jr.

[57] ABSTRACT

A receiver and decoder for signals of the pulse width modulated type including, essentially, only an amplifier, an interval timer, and a shift register or other device for utilizing the decoded, incoming signals.

2 Claims, 1 Drawing Figure

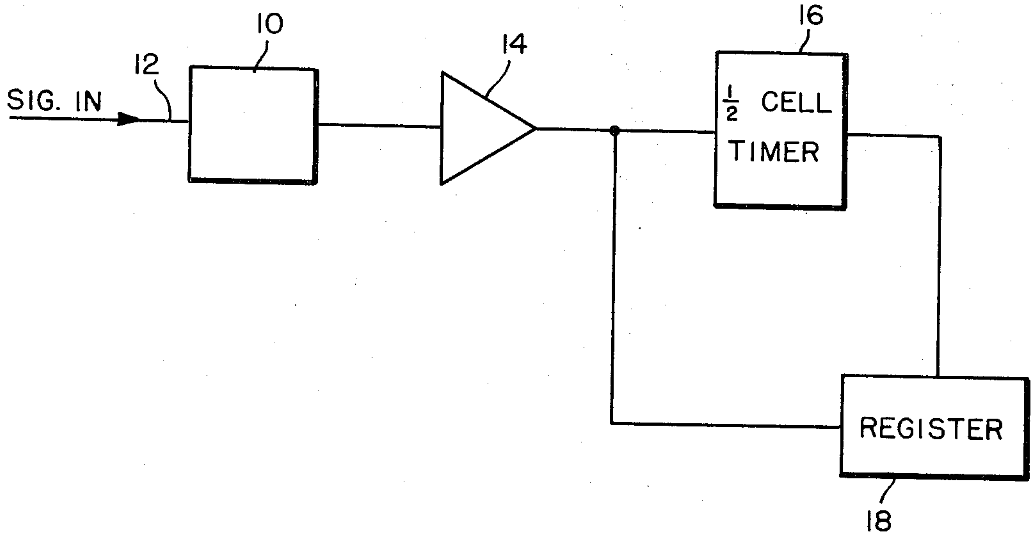
SIG. IN
12
10
14
16
½ CELL TIMER
REGISTER
18

RECEIVER FOR PULSE WIDTH MODULATED SIGNALS

This invention relates to a novel pulse width modulated signalling system, and, more particularly, to a receiver for receiving, decoding, and temporarily storing data signals derived from the pulse width modulated signals.

PRIOR ART

The present invention is concerned with signalling systems using signals in the form of square waves of the return-to-zero type in which the successive bit cells, or time slots, are all of substantially equal duration, and in which the nature of the data bit encoded in each bit cell is indicated by the duration of the dwell following the beginning of the cell. A typical signal of this kind is described in connection with the writing circuit shown in U.S. Pat. No. 2,887,674, issued to G. B. Greene May 19, 1959.

The signal produced by the patented circuit may be represented as a so-called square wave signal of uniform period in which the return-to-zero transition is timed to indicate the nature of the data it is desired to transmit in each bit cell. To send a data 1, for example, the transition may be made to occur during the first half of the bit cell, and to send a data 0 during the second half.

In the patented system, the signals are recorded magnetically on a moving medium, and are differentiated as they are read out from the medium, so that the reading device must deal with a series of relatively sharp pulses in which the intervals between the pulses correspond to the durations of the successive levels of the recorded square wave.

BRIEF DESCRIPTION OF THE INVENTION

The receiver of the invention is designed to receive square wave signals of the kind just described, and is of very simple and inexpensive construction, yet highly reliable and capable of high speed operation. Actual embodiments of the invention have been operated at rates of one to two megahertz, using a conventional twisted pair telephone line to connect them to the transmitters.

According to the invention, the incoming signal is fed to an amplifier which preferably is of the kind having a high gain characteristic so that it sharpens the incoming pulses and thereby compensates for any degradation of the signal such as may be caused, for example, by the transmission line from the transmitter. The output of the amplifier is fed to an interval timer such as a monostable multivibrator to trigger it, and also to the input of a shift register or other temporary storage device. The output of the interval timer is used to step the shift register so that the signal level fed into the shift register is the level of the incoming signal at the end of the interval timed by the timer. The interval timed is selected to be one-half the period of the incoming square wave. If the transition to zero occurs during the first half of the period the shift register is stepped to record the low level, whereas if the transition occurs during the second half the high level is entered into the register.

The arrangement is exceedingly simple, yet reliable. Stepping of the store achieves a function similar to gating, yet no separate gate circuit is used.

DETAILED DESCRIPTION

A presently preferred embodiment of the invention will now be described in detail in conjunction with the accompanying drawing, wherein the single FIGURE is a schematic circuit diagram in block form of a receiver according to the invention.

As shown, the receiver includes a line terminating network 10 connected between the incoming transmission line 12 and the input of a high gain amplifier 14. The network 10 serves to match the impedance of the transmission line 12 and to reduce the effect of random transient currents that may occur in the line. The output of the amplifier 14 is applied to trigger a monostable multivibrator 16 at the beginning of each bit cell of the incoming square wave. Since the receiver deals with signals of the return-to-zero type the beginning of each bit cell is marked by a voltage transition of one polarity only, and it is, therefore, simple to identify. The output of the receiver 14 is also fed to the signal input of a shift register 18 where the signals may be stored until they are erased.

The multivibrator 16 is set to time an interval equal to one-half the period of the incoming square wave, and its output is applied to step the shift register 18 each time the multivibrator times out.

The signal entered into the shift register 18 at the time it is stepped corresponds to the level of the incoming signal at the middle of the bit cell. If the return-to-zero transition occurs during the first half of the bit cell, a signal indicating the zero level is entered into the register. If the transition occurs during the second half of the cell, a signal representing the high level is entered.

Although the system described herein was designed for use in an automatic telephone switching system for transmitting data among the various functional units of the system, and uses hard wire transmission lines between the transmitters and receivers, it will be understood that other transmission media may also be used such as, for example, radio, laser, or audio waves. All that is needed is the inclusion of suitable modulating and demodulating gear.

What is claimed is:

1. A receiving and decoding circuit for pulse width modulated signals of the return-to-zero kind in which the successive bit cells are of approximately equal durations comprising an amplifier, means for applying the incoming pulse width modulated signal to the input of said amplifier, an interval timer set to time an interval approximately equal to one half the duration of one of the bit cells of the incoming signal, a steppable signal storage medium, means for applying the output of said amplifer to said interval timer and to the signal input terminal of said storage medium, and means for applying the output of said interval timer to said storage medium to cause it to step at the end of each interval timed by said timer.

2. A receiving and decoding circuit according to claim 1, wherein said amplifier is one having a high gain characteristic so that it compensates for signal degradation that may occur between the point of origin of the incoming signal and the amplifier.

* * * * *